United States Patent
Tao

(10) Patent No.: US 10,013,645 B2
(45) Date of Patent: Jul. 3, 2018

(54) IMAGE FORMING APPARATUS AND METHOD FOR CONTROLLING AN IMAGE FORMING APPARATUS

(71) Applicant: KYOCERA Document Solutions Inc., Osaka (JP)

(72) Inventor: Kozo Tao, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 15/594,111

(22) Filed: May 12, 2017

(65) Prior Publication Data

US 2017/0337455 A1 Nov. 23, 2017

(30) Foreign Application Priority Data

May 20, 2016 (JP) .................. 2016-101213

(51) Int. Cl.
*G06F 15/00* (2006.01)
*G06K 15/00* (2006.01)
*G06F 3/12* (2006.01)

(52) U.S. Cl.
CPC .......... *G06K 15/408* (2013.01); *G06F 3/121* (2013.01); *G06F 3/1234* (2013.01)

(58) Field of Classification Search
CPC ...... G06K 15/408; G06F 3/1234; G06F 3/121

USPC ........................................................ 358/1.14
See application file for complete search history.

(56) References Cited

U.S. PATENT DOCUMENTS

2005/0179931 A1 8/2005 Yamaguchi et al. ......... 358/1.14
2013/0321849 A1* 12/2013 Masui ................ G06K 15/1809
358/1.14

FOREIGN PATENT DOCUMENTS

JP 2005-219247 A 8/2005

* cited by examiner

*Primary Examiner* — Saeid Ebrahimi Dehkordy
(74) *Attorney, Agent, or Firm* — Stein IP, LLC

(57) ABSTRACT

An image forming apparatus has a storage portion, a mechanism control portion, and a main control portion. The storage portion stores information as to the apparatus. The mechanism control portion controls the operation of a mechanical system in the apparatus. The main control portion performs a job related to a function of the apparatus by controlling the operation of individual constituent elements of the apparatus, and on detecting an error that prevents continuation of the operation of the mechanical system included in the job being performed, feeds the mechanism control portion with an instruction to interrupt the control of the operation of the mechanical system, stores in the storage portion uncompleted data of the job corresponding to the operation of the mechanism control portion left uncompleted as a result of the interruption, reboots itself, and restarts the job by using the uncompleted data.

4 Claims, 3 Drawing Sheets

IMAGE FORMING APPARATUS AND METHOD FOR CONTROLLING AN IMAGE FORMING APPARATUS

INCORPORATION BY REFERENCE

This application is based upon and claims the benefit of priority from the corresponding Japanese Patent Application No. 2016-101213 filed on May 20, 2016, the entire contents of which are incorporated herein by reference.

BACKGROUND

The present disclosure relates to an image forming apparatus provided with a function of performing reboot processing.

An image forming apparatus such as a copier, a printer, or a facsimile machine incorporates various constituent elements such as those that govern software-implemented operations, such as image processing and data communication, and those that govern hardware-implemented operation, such as the control of motors, clutches, and heaters. On the other hand, in an image forming apparatus, an error can occur that prevents proper operation of the individual constituent elements.

One example of errors that can occur in an image forming apparatus is a video underrun error. In an image forming apparatus, where complicated programs are run and a large amount of data has to be processed, the data bus is used at a considerably high rate. This may cause a delay when, in the image forming apparatus, data obtained through image processing by, for example, an image processing portion is stored in a storage portion or the like. As a result, image data for printing cannot be prepared in time, resulting in a video underrun error. Inconveniently, this may make it impossible for the image forming apparatus to complete a job that has to be completed and then proceed to perform the next job.

In this connection, an image forming apparatus is known that is provided with a means for detecting, out of faults that are likely to be recovered from by turning the power OFF and then ON, those that can be dealt with by rebooting and a means for rebooting the hardware resources and the program for image formation processing. In this image forming apparatus, when an error occurs that prevents continuation of proper operation of the individual hardware resources (constituent elements), the entire image forming apparatus is rebooted to recover from the error and restore normal operation. Thus, this image forming apparatus can reboot itself automatically and properly without requiring any operation by the user.

SUMMARY

According to a first aspect of the present disclosure, an image forming apparatus configured to perform rebooting on detection of an error includes a storage portion, a mechanism control portion, and a main control portion. The storage portion is configured to store various kinds of information as to the image forming apparatus. The mechanism control portion is configured to control the operation of a mechanical system provided in the image forming apparatus. The main control portion is configured to perform a job related to a function of the image forming apparatus by controlling the operation of constituent elements, including the mechanism control portion, provided in the image forming apparatus, and on detecting an error that prevents continuation of the operation of the mechanical system included in the job being performed, feed the mechanism control portion with an instruction to interrupt the control of the operation of the mechanical system, store in the storage portion uncompleted data of the job corresponding to the operation of the mechanism control portion left uncompleted as a result of the interruption, reboot the main control portion itself, and restart the job by using the uncompleted data.

According to a second aspect of the present disclosure, a method for controlling an image forming apparatus configured to perform rebooting on detection of an error includes: a job performing step of making a main control portion perform data processing related to a job and feed a mechanism control portion with an operation instruction related to the job; an error detection step of detecting an error that prevents continuation of the operation of the mechanical system included in the job being performed; an interruption instruction step of sending an instruction to interrupt the control of the operation of the mechanical system by the mechanism control portion based on the error; a completion check step of checking for completion of the data processing; a storage processing step of storing, out of the data used in the data processing completed, uncompleted data corresponding to the operation of the mechanical system left uncompleted as a result of the interrupt; a reboot performing step of storing reboot-performed information and rebooting the main control portion itself; an information acquisition step of, after the reboot performing step, acquiring mechanism information including the configuration and the status of the mechanical system and the uncompleted data; and a job restarting step of restarting the job by using the uncompleted data and the mechanism information.

DETAILED DESCRIPTION

Embodiments of the present disclosure will be described below with reference to the accompanying drawings. The present disclosure is not limited to what is specifically mentioned below.

First Embodiment

Figure 1:
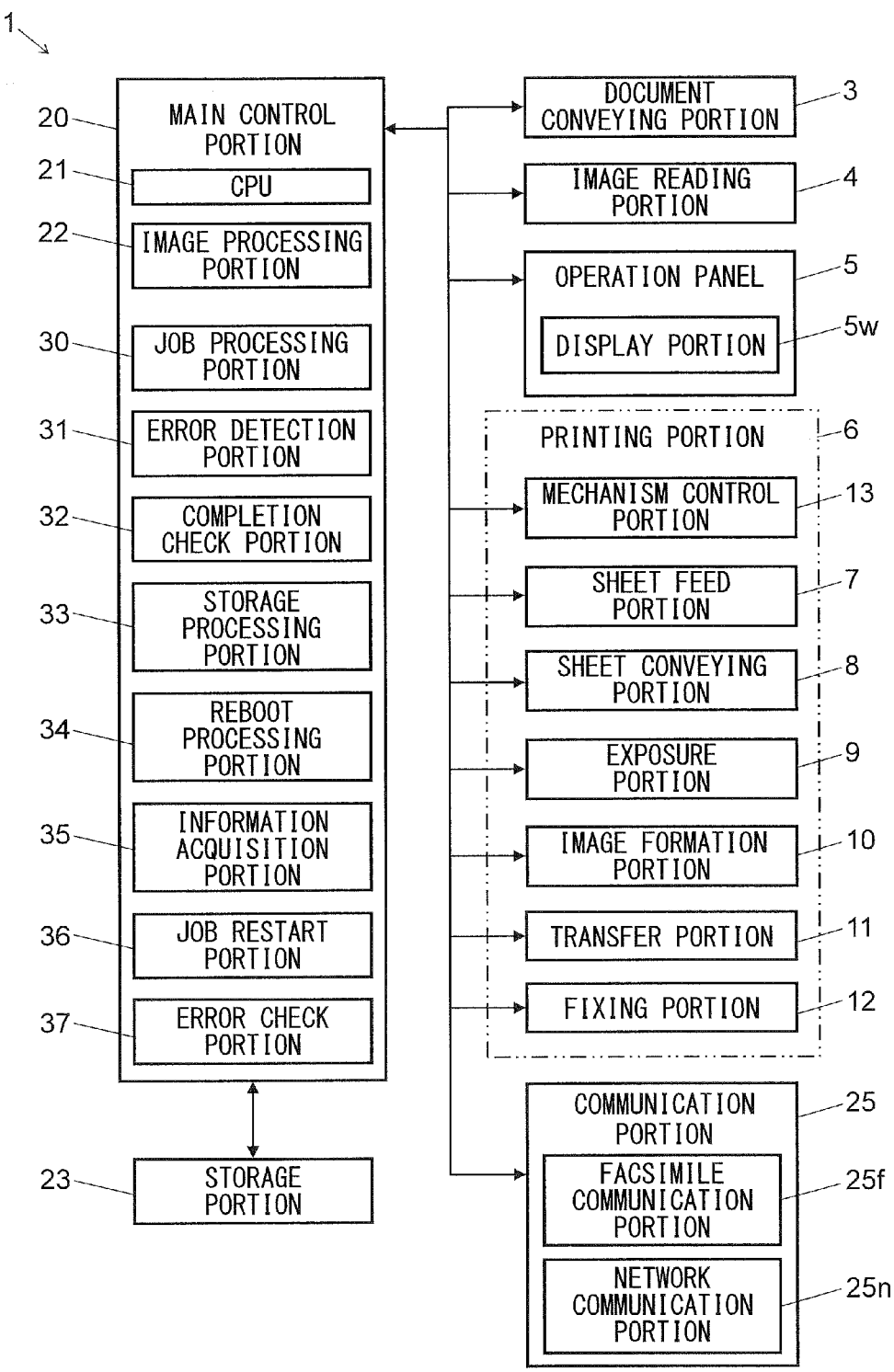
FIG. 1 is a block diagram showing the configuration of an image forming apparatus according to a first embodiment of the present disclosure.

First, as to an image forming apparatus according to a first embodiment of the present disclosure, its configuration will be described with reference to FIG. 1. FIG. 1 is a block diagram showing the configuration of the image forming apparatus. This image forming apparatus is a so-called multifunction peripheral provided with a plurality of functions such as copying (printing), scanning (image-reading), and facsimile-transmitting functions.

The image forming apparatus 1 is provided with a main control portion 20 and a storage portion 23. The main control portion 20 includes a CPU 21, an image processing portion 22, and other unillustrated electronic circuits and components. The CPU 21 performs processing related to the functions of the image forming apparatus 1 by controlling the operation of individual constituent elements provided in the image forming apparatus 1 based on programs and data for control stored in the storage portion 23. The image processing portion 22 performs image processing on image data used in printing, image reading, and transmission. The storage portion 23 is composed of, for example, a combination of a non-volatile storage device, such as program ROM and data ROM, and a volatile storage device, such as RAM, of which none is illustrated.

In an upper part of the image forming apparatus 1, a document conveying portion 3 and an image reading portion 4 are provided. When the user wants the image forming apparatus 1 to perform an image-read job, he places a document carrying an image containing characters, figures, patterns, and the like on the document conveying portion 3, or places such a document on an unillustrated contact glass at the top of the image reading portion 4. The main control portion 20 gives the document conveying portion 3 and the image reading portion 4 operation instructions to make them read the image on the document.

In an upper part of the image forming apparatus 1, on the front side of the image reading portion 4, an operation panel 5 is provided. The operation panel 5 includes a display portion 5w. The operation panel 5 accepts instructions that the user gives to the image forming apparatus 1 to make it perform a copy (print) job, a scan (image-read) job, a facsimile-transmission job, and the like. The operation panel 5 accepts, for example, settings for printing conditions such as what type and size of sheets to use in printing, whether to enlarge or reduce or not, whether to perform two-sided printing or not, and also accepts input of settings such as facsimile numbers and sender names in facsimile transmission. The operation panel 5 also serves as an indication portion that, by displaying on the display portion 5w the status of the apparatus, warnings, error messages, and the like, indicates them to the user. The information entered and accepted on the operation panel 5 is transmitted to the main control portion 20.

The image forming apparatus 1 is provided with, in a part under the image reading portion 4, a printing portion 6 for performing a print job. The printing portion 6 includes a sheet feed portion 7, a sheet conveying portion 8, an exposure portion 9, an image formation portion 10, a transfer portion 11, and a fixing portion 12. The sheet feed portion 7 contains a plurality of sheets, and feeds them out during printing. The sheet conveying portion 8 conveys the sheets fed out from the sheet feed portion 7, and discharges the sheets that have undergone fixing out of the apparatus. At a number of places in the sheet conveying portion 8, sheet detection sensors (unillustrated) for detecting the presence of a sheet are arranged, and sheet detection information from them is transmitted to the main control portion 20. The exposure portion 9 radiates toward the image formation portion 10 laser light controlled based on image data. With the laser light radiated from the exposure portion 9, the image formation portion 10 forms an electrostatic latent image of the document image, and attaches toner to the electrostatic latent image to form a toner image. The transfer portion 11 transfers the toner image formed by the image formation portion 10 to a sheet. The fixing portion 12 heats and presses the sheet having the toner image transferred to it, and thereby fixes the toner image to the sheet. Such printing operation by the printing portion 6 is controlled by the main control portion 20.

The printing portion 6 further includes a mechanism control portion 13. The mechanism control portion 13, like the main control portion 20, includes a CPU, a control circuit, a storage portion, and other unillustrated electronic circuits and components. In response to operation instructions from the main control portion 20, the mechanism control portion 13 controls the operation of the mechanical system, such as motors, clutches, and solenoids, provided in the printing portion 6.

Also the document conveying portion 3 and the image reading portion 4 are respectively provided with similar mechanism control portions, though unillustrated. These mechanism control portions control the operation of the mechanical system, such as motors, clutches, and solenoids, provided in the document conveying portion 3 and the image reading portion 4 respectively. As the representative of all those mechanism control portions, the mechanism control portion 13 in the printing portion 6 will be taken up below for a detailed description.

The image forming apparatus 1 is provided with a communication portion 25 for conducting communication, such as facsimile transmission/reception and data transmission/reception, with an external communication device or computer or the like. The communication portion 25 includes a facsimile communication portion 25f and a network communication portion 25n. The facsimile communication portion 25f is connected to a telephone line, and by using it exchanges image data and the like with an external communication device. The network communication portion 25n is connected to a network line, and by using it exchanges image data and the like with an external communication device. The main control portion 20 makes the communication portion 25 transmit and receive data to and from an external communication device and the like.

While performing an ordinary image-formation or print job, the image forming apparatus 1, on detecting in the middle of the job an error that prevents continuation of the job, performs reboot processing. An error that prevents continuation of a job can be, for example, a video underrun error. The main control portion 20 includes a job processing portion 30, an error detection portion 31, a completion check portion 32, a storage processing portion 33, a reboot processing portion 34, an information acquisition portion 35, a job restart portion 36, and an error check portion 37.

The job processing portion 30, the error detection portion 31, the completion check portion 32, the storage processing portion 33, the reboot processing portion 34, the information acquisition portion 35, the job restart portion 36, and the error check portion 37 may be provided as constituent elements of the image forming apparatus 1 that are separate from the main control portion 20. Instead, a program that includes the job processing portion 30, the error detection portion 31, the completion check portion 32, the storage processing portion 33, the reboot processing portion 34, the information acquisition portion 35, the job restart portion 36, and the error check portion 37 may be used.

The job processing portion 30 performs data processing related to a job. The job processing portion 30 feeds the mechanism control portion 13 with operation instructions for the mechanical system related to a job. For example, for a print job, the job processing portion 30 feeds the mechanism control portion 13 with operation instructions for motors, clutches, and the like related to the print job. Moreover, when the error detection portion 31 detects an error, according to the error the job processing portion 30 feeds the mechanism control portion 13 with an instruction to interrupt the control of the operation of the mechanical system.

The error detection portion 31 detects an error that prevents continuation of an operation of the mechanical system included in a job.

The completion check portion 32 checks for completion of data processing related to a job performed by the job processing portion 30. In this connection, on receiving an instruction to interrupt the control of the operation of the mechanical system, the mechanism control portion 13 waits for completion of the operation of the mechanical system being performed and then notifies the main control portion 20 of the completion. For example, in a case where, in a print job, a sheet fed out from the sheet feed portion 7 and in the middle of being conveyed is present in a conveying passage, the mechanism control portion 13 waits for the sheet to be discharged out of the apparatus and then notifies the main control portion 20 of the completion. After the instruction to interrupt the operation of the mechanical system, the main control portion 20 waits for a notification from the mechanism control portion 13 of the completion of the operation of the mechanical system, and then makes the completion check portion 32 check for completion of the data processing.

When the operation of the mechanical system is interrupted in the middle of a job, part of the job remains as uncompleted data corresponding to the operation of the mechanical system left uncompleted as a result of the interruption. The storage processing portion 33 stores, out of the data used in the data processing that has been completed, the uncompleted data in a non-volatile storage device, such as data ROM, in the storage portion 23. Instead, the storage processing portion 33 may store the uncompleted data in an external storage device via the communication portion 25. Usable as an external storage device is, for example, a shared storage device on a LAN (local area network) or a cloud storage.

The reboot processing portion 34 stores in the storage portion 23 reboot-performed information based on an error that occurs in the image forming apparatus 1. The reboot-performed information is information indicating that the main control portion 20 itself has been rebooted, and can be represented, for example, by a flag in a program. The reboot processing portion 34 reboots the main control portion 20 itself.

After the rebooting of the main control portion 20 by the reboot processing portion 34, the information acquisition portion 35 acquires from the mechanism control portion 13 mechanism information including the configuration and the status of the mechanical system, and acquires from the storage portion 23 the uncompleted data. The mechanism information includes information on configuration, such as how many sheet feed cassettes (unillustrated) are provided as sheet storage portions in the sheet feed portion 7 and whether or not any optional device is attached, and information on status, such as whether or not any warning or error has occurred.

The job restart portion 36 restarts a job based on the uncompleted data and the mechanism information acquired by the information acquisition portion 35.

The error check portion 37 checks whether or not the mechanism information acquired by the information acquisition portion 35 includes a mechanism error related to the control of the operation of the mechanical system. A mechanism error is, for example, a failure in two-sided printing.

Figure 2:
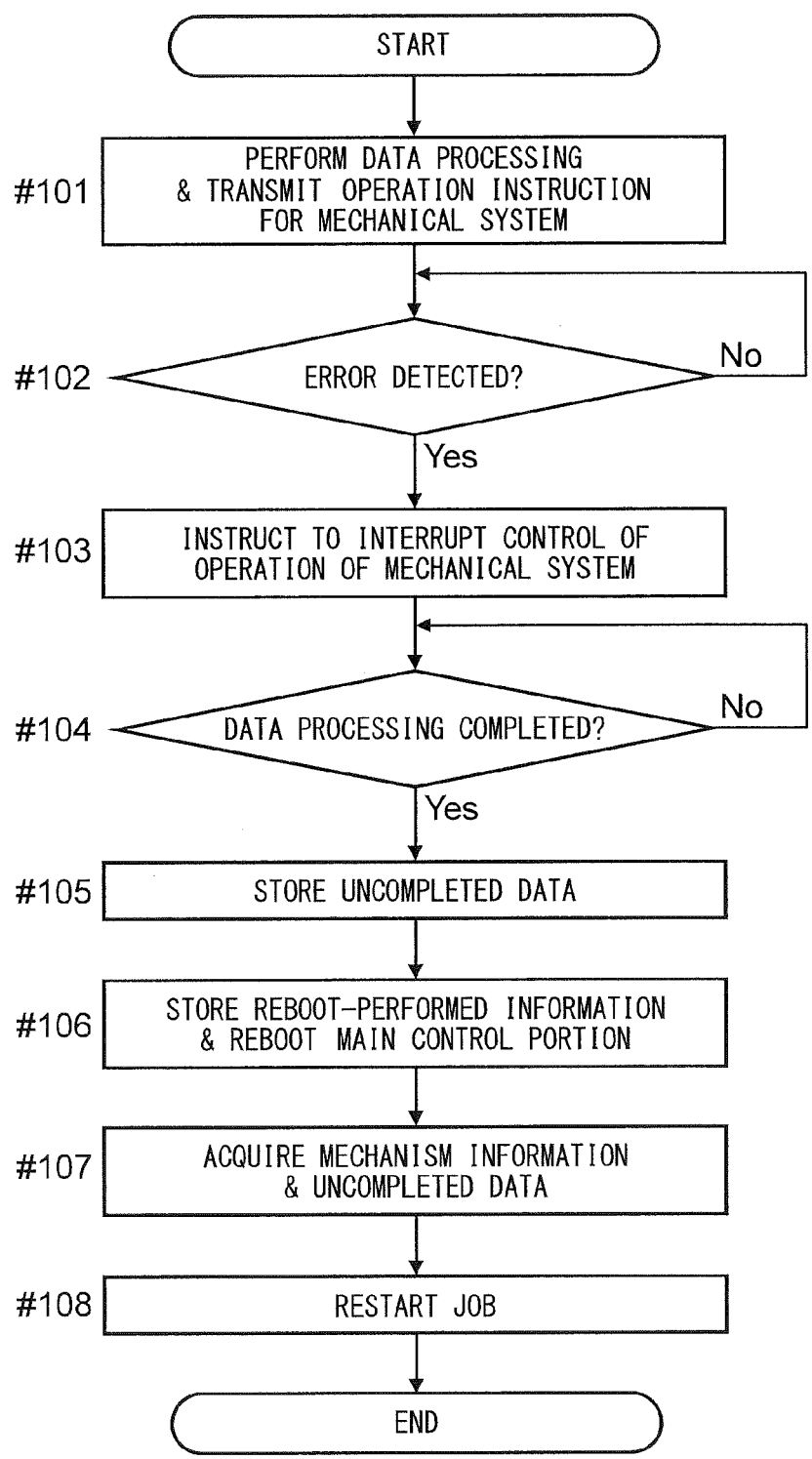
FIG. 2 is a flow chart showing an example of reboot processing in the image forming apparatus according to the first embodiment of the present disclosure.

Next, an example of reboot processing in the image forming apparatus 1 will be described with reference to FIG. 2. FIG. 2 is a flow chart showing an example of reboot processing in the image forming apparatus 1.

On accepting an instruction to perform a job via the operation panel 5 or the communication portion 25, the image forming apparatus 1 starts to perform the job (START in FIG. 2). Suppose here that the image forming apparatus 1 accepts a print job from an external computer and performs it. The image forming apparatus 1 receives print data from the external computer via the communication portion 25.

At step #101, the job processing portion 30 performs data processing related to the print job. The data processing here by the job processing portion 30 is processing for receiving the print data from the external computer and storing the print data in the storage portion 23. The job processing portion 30 then feeds the mechanism control portion 13 with an operation instruction for the mechanical system related to the print job.

At step #102, the job processing portion 30 checks whether or not the error detection portion 31 has detected an error that prevents continuation of the operation of the mechanical system included in the print job being performed. In a case where a print job is accepted from an external computer, an error that prevents continuation of the operation of the mechanical system is, for example, a video underrun error, but may instead be any other error. So long as no error is detected, the check at step #102 is repeated to continue the print job. If an error is detected, the flow proceeds to step #103.

At step #103, based on the error detected at step #102, the job processing portion 30 feeds the mechanism control portion 13 with an instruction to interrupt the control of the operation of the mechanical system. Here, the mechanism control portion 13 waits for completion of the operation of the mechanical system being performed and then notifies the main control portion 20 of the completion. For example, if, in a print job, a sheet fed out from the sheet feed portion 7 and in the middle of being conveyed is present in the conveying passage, the mechanism control portion 13 waits for the sheet to be discharged out of the apparatus and then notifies the main control portion 20 of the completion.

At step #104, the completion check portion 32 checks whether or not the data processing related to the print job performed by the job processing portion 30 has been completed. That is, the completion check portion 32 checks whether or not the processing for receiving the print data from the external computer and storing the print data in the storage portion 23 has completed. Here, the main control portion 20 waits for a notification from the mechanism control portion 13 of completion of the operation of the mechanical system and then makes the completion check portion 32 check for the completion of the data processing. If the data processing has not been completed, while the check at step #104 is repeated, the data processing is continued. If the print data has been completed, the flow proceeds to step #105.

At step #105, the storage processing portion 33 stores in the storage portion 23, out of the data used in the data processing completed at step #104, uncompleted data of the print job corresponding to the operation of the mechanical system left uncompleted as a result of the interruption of the operation of the mechanical system.

At step #106, based on the error detected at step #102, the reboot processing portion 34 stores reboot-performed information in the storage portion 23. The reboot processing portion 34 then reboots the main control portion 20 itself.

At step #107, the information acquisition portion 35 acquires from the mechanism control portion 13 mechanism information including information on the configuration and the status of the mechanical system, and acquires from the storage portion 23 the uncompleted data.

At step #108, the job restart portion 36 restarts the job by using the uncompleted data and the mechanism information acquired by the information acquisition portion 35. This completes the reboot processing of the image forming apparatus 1 (END in FIG. 2).

As described above, on detecting an error (for example, a video underrun error) that prevents continuation of the operation of the mechanical system included in a print job being performed, the image forming apparatus 1 stores uncompleted data of the print job and thereby carries over the status of the print job before the occurrence of the error. The image forming apparatus 1 then restarts the print job by using the uncompleted data, and thereby avoids performing from the beginning the print job that has proceeded halfway.

Second Embodiment

Figure 3:
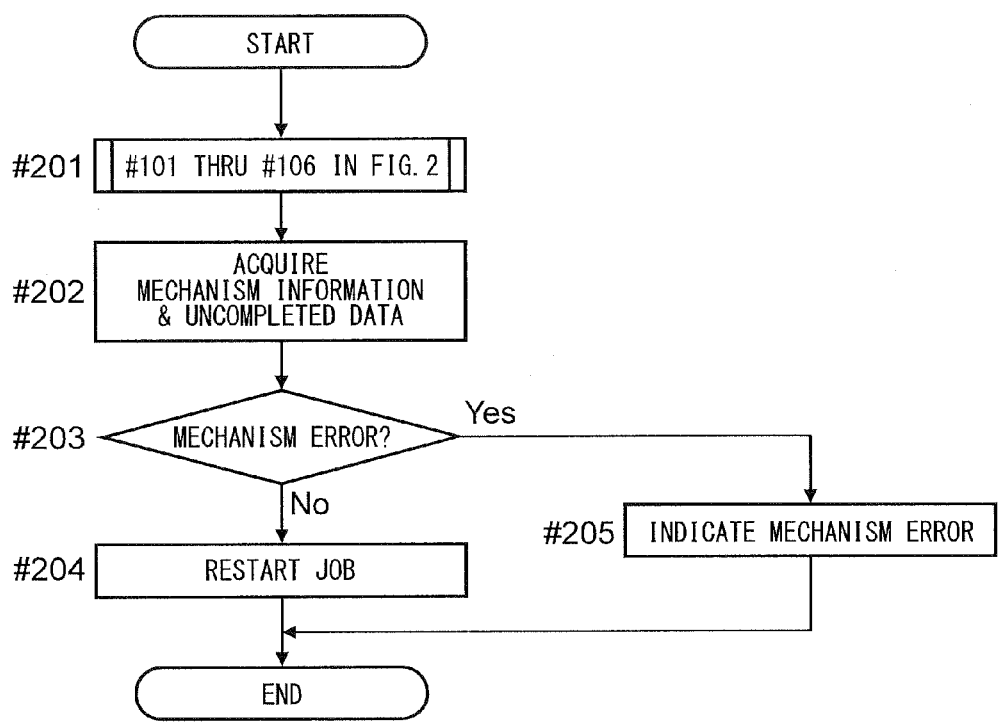
FIG. 3 is a flow chart showing an example of reboot processing in an image forming apparatus according to a second embodiment of the present disclosure.

Next, an image forming apparatus according to a second embodiment of the present disclosure will be described with reference to FIG. 3. FIG. 3 is a flow chart showing an example of reboot processing in the image forming apparatus. The configuration in this embodiment is basically the same as that in the first embodiment; accordingly, such constituent elements as are found also in the first embodiment are identified by common reference signs or part names, and overlapping description will occasionally be omitted.

On accepting an instruction to perform, for example, a print job, the image forming apparatus 1 according to the second embodiment starts to perform the print job (START in FIG. 3).

What is performed at Step #201 is the same as what is performed at steps #101 through #106 shown in FIG. 2 and described in connection with the first embodiment, and accordingly no overlapping description will be repeated. Specifically, the storage processing portion 33 stores in the storage portion 23 uncompleted data of the print job corresponding to the operation of the mechanical system left uncompleted as a result of interruption of the operation of the mechanical system due to an error that prevents continuation of the operation of the mechanical system included in the print job being performed. Moreover, based on the error, the reboot processing portion 34 stores reboot-performed information in the storage portion 23 and reboots the main control portion 20 itself.

At step #202, the information acquisition portion 35 acquires from the mechanism control portion 13 mechanism information including the configuration and the status of the mechanical system, and acquires the uncompleted data from the storage portion 23.

At step #203, the error check portion 37 checks whether or not the mechanism information acquired by the information acquisition portion 35 at step #202 includes an mechanism error related to the control of the operation of the mechanical system. If no mechanism error is included, the flow proceeds to step #204. If a mechanism error is included, the flow proceeds to step #205.

At step #204, the job restart portion 36 restarts the job by using the uncompleted data and the mechanism information acquired by the information acquisition portion 35. This completes the reboot processing of the image forming apparatus 1 (END in FIG. 3).

At step #205, the main control portion 20 makes the display portion 5w, which serves as an indication portion, indicate the mechanism error. To indicate the error, the display portion 5w displays a message or the like. The mechanism error may instead be indicated with a warning beep or other sound, or with light emission from a light source. This completes the reboot processing of the image forming apparatus 1 (END in FIG. 3).

As described by way of embodiments above, an image forming apparatus 1 is configured to perform rebooting on detection of an error, and includes a storage portion 23, a mechanism control portion 13, and a main control portion 20. The storage portion 23 is configured to store various kinds of information as to the image forming apparatus 1. The mechanism control portion 13 is configured to control the operation of a mechanical system provided in the image forming apparatus 1. The main control portion 20 is configured to perform a job related to a function of the image forming apparatus 1 by controlling the operation of constituent elements, including the mechanism control portion 13, provided in the image forming apparatus 1, and on detecting an error that prevents continuation of the operation of the mechanical system included in the job being performed, feed the mechanism control portion 13 with an instruction to interrupt the control of the operation of the mechanical system, store in the storage portion 23 uncompleted data of the job corresponding to the operation of the mechanism control portion 13 left uncompleted as a result of the interruption, reboot the main control portion 20 itself, and restart the job by using the uncompleted data.

With this configuration, on detecting an error that prevents continuation of the operation of the mechanical system included in a job being performed, the image forming apparatus 1 stores uncompleted data of the job. It is thus possible to carry over the status of the job before the occurrence of the error. The image forming apparatus 1 then restarts the job by using the uncompleted data. It is thus possible to avoid performing from the beginning a job that has proceeded halfway. In this way, it is possible to suppress wasting the operating time of the image forming apparatus 1 and wasting resources such as sheets and toner.

Moreover, with this configuration, whereas the main control portion 20 is rebooted, the mechanism control portion 13 is not. If, for discussion's sake, the main control portion 20 and the mechanism control portion 13 are both rebooted, it may be impossible to grasp the timing for retrial, making synchronous operation difficult. By contrast, with the configuration of the embodiments described above, it is possible to achieve synchronous operation easily.

The main control portion 20 may include a job processing portion 30, an error detection portion 31, a completion check portion 32, a storage processing portion 33, a reboot processing portion 34, an information acquisition portion 35, and a job restart portion 36. The job processing portion 30 is configured to perform data processing related to the job to feed the mechanism control portion 13 an operation instruction for the mechanical system related to the job and feed the mechanism control portion 13 with an instruction to interrupt the control of the operation of the mechanical system based on the error detected by the error detection portion 31. The error detection portion 31 is configured to detect the error that prevents the continuation of the operation of the mechanical system included in the job being performed. The completion check portion 32 is configured to check for completion of the data processing related to the job. The storage processing portion 33 is configured to store in the storage portion 23, out of the data used in the data processing completed, the uncompleted data of the job corresponding to the operation of the mechanism control portion 13 left uncompleted as a result of the interruption. The reboot processing portion 34 is configured to store in the storage portion 23 reboot-performed information based on the error and reboot the main control portion 20 itself. The information acquisition portion 35 is configured to acquire, after the rebooting of the main control portion 20 by the reboot processing portion 34, mechanism information including the configuration and the status of the mechanical system from the mechanism control portion 13 and the uncompleted data from the storage portion 23. The job restart portion 36 is configured to restart the job by using the uncompleted data and the mechanism information.

With this configuration, it is possible to efficiently perform individual processes including performing a job, detecting an error that prevents continuation of the operation of the mechanical system included in the job being performed, interrupting the control of the operation of the mechanical system, storing uncompleted data of the job corresponding to the operation of the mechanical system left uncompleted as a result of the interruption, rebooting the main control portion 20, and restarting the job.

The image forming apparatus 1 may further include an error check portion 37 configured to check whether or not the mechanism information acquired by the information acquisition portion 35 includes a mechanism error related to the control of the operation of the mechanical system and an indication portion 5w configured to indicate the mechanism error.

With this configuration, it is possible to detect a mechanism error that prevents continuation of the job even when the main control portion 20 is rebooted. It is thus possible to prevent recurrence of a mechanism error. It is further possible to notify the user of the condition and prompt for an action.

The mechanism control portion 13 may be configured to, on receiving the instruction to interrupt, wait for completion of the operation of the mechanical system being performed and then notify the main control portion 20 with the completion. The main control portion 20 may be configured to, after feeding the mechanism control portion 13 with the instruction to interrupt, wait for a notification from the mechanism control portion 13 of the completion of the operation of the mechanical system and then make the completion check portion 32 check for the completion of the data processing.

With this configuration, for example, if, in a print job, a sheet fed out from the sheet feed portion 7 and in the middle of being conveyed is present in a conveying passage, the sheet is waited for to be discharged out of the apparatus, and then the main control portion 20 is notified of the completion. It is thus possible to prevent the main control portion 20 from being rebooted with a sheet in the middle of being conveyed present in the conveying passage.

The image forming apparatus 1 may further include a communication portion 25 configured to exchange data with an external device, and the storage processing portion 33 may be configured to store the uncompleted data in the external device via the communication portion 25.

With this configuration, for example, even if a fault in the storage portion 23 causes an error, it is possible to cope with it. It is thus possible to restart the job reliably.

It should be understood that the embodiments of the present disclosure described above are in no way meant to limit its scope; the present disclosure can be implemented with any modifications made without departing from its spirit.

For example, although in the above embodiments, a print job is taken as an example to describe configurations according to the present disclosure, the target of the present disclosure is not limited to a print job, but may instead be any other job. For example, a configuration according to the present disclosure can be applied to any other job that uses the document conveying portion 3, the image reading portion 4, or any other constituent element of the image forming apparatus 1, or any optional device for the image forming apparatus 1.

What is claimed is:

1. An image forming apparatus configured to perform rebooting on detection of an error, comprising:
   a storage portion configured to store various kinds of information as to the image forming apparatus;
   a document conveying portion and an image reading portion configured to read an image carried on a document;
   a printing portion configured to perform a printing operation by forming a toner image of a document image read from the document and fixing the toner image to a sheet fed out from a sheet feed portion;
   a mechanism control portion configured to control operation of a mechanical system including a motor, a clutch, and a solenoid provided in the document conveying portion, the image reading portion, and the printing portion; and
   a main control portion configured to
      perform a job related to a function of the image forming apparatus by controlling operation of the document conveying portion, the image reading portion, and the printing portion, including the mechanism control portion, and on detecting an error that prevents continuation of the operation of the mechanical system included in the job being performed,
      feed the mechanism control portion with an instruction to interrupt control of the operation of the mechanical system,
      store in the storage portion uncompleted data of the job corresponding to the operation of the mechanism control portion left uncompleted as a result of the interruption,
      reboot the main control portion, and
      restart the job by using the uncompleted data,
   wherein
   the main control portion includes:
   an error detection portion configured to detect a video underrun error that prevents the continuation of the operation of the mechanical system included in the job being performed;
   a job processing portion configured to
      perform data processing related to the job to feed the mechanism control portion an operation instruction for the mechanical system related to the job and
      feed the mechanism control portion with an instruction to interrupt the control of the operation of the mechanical system based on the video underrun error;
   a completion check portion configured to check for completion of the data processing related to the job;
   a storage processing portion configured to store in the storage portion, out of the data used in the data processing completed, the uncompleted data of the job corresponding to the operation of the mechanism control portion left uncompleted as a result of the interruption;
   a reboot processing portion configured to store in the storage portion reboot-performed information based on the video underrun error and reboot the main control portion;

an information acquisition portion configured to acquire, after rebooting of the main control portion by the reboot processing portion, mechanism information from the mechanism control portion and the uncompleted data from the storage portion, the mechanism information including
information on a configuration of the mechanical system as to attachment of an optional device to the image forming apparatus and the sheet feed portion and
information on occurrence status of the video underrun error and a warning; and
a job restart portion configured to restart the job by using the uncompleted data and the mechanism information.

2. The image forming apparatus of claim 1, further comprising:
an error check portion configured to check whether or not the mechanism information acquired by the information acquisition portion includes a mechanism error related to the control of the operation of the mechanical system; and
an indication portion configured to indicate the mechanism error.

3. The image forming apparatus of claim 1, wherein
the mechanism control portion is configured to, on receiving the instruction to interrupt, wait for completion of the operation of the mechanical system being performed and then notify the main control portion with the completion, and
the main control portion is configured to, after feeding the mechanism control portion with the instruction to interrupt, wait for a notification from the mechanism control portion of the completion of the operation of the mechanical system and then make the completion check portion check for the completion of the data processing.

4. The image forming apparatus of claim 1, further comprising:
a communication portion configured to exchange data with an external device, wherein
the storage processing portion is configured to store the uncompleted data in the external device via the communication portion.

* * * * *